US010092131B2

(12) United States Patent
Ferraro et al.

(10) Patent No.: US 10,092,131 B2
(45) Date of Patent: Oct. 9, 2018

(54) BEVERAGE FROTHING DEVICE AND JUG COMPRISING SAID DEVICE

(71) Applicant: KONINKLIJKE PHILIPS N.V., Eindhoven (NL)

(72) Inventors: Andrea Ferraro, Eindhoven (NL); Marco Santini, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 163 days.

(21) Appl. No.: 15/037,369

(22) PCT Filed: Nov. 25, 2014

(86) PCT No.: PCT/EP2014/075529
§ 371 (c)(1),
(2) Date: May 18, 2016

(87) PCT Pub. No.: WO2015/078858
PCT Pub. Date: Jun. 4, 2015

(65) Prior Publication Data
US 2016/0296063 A1 Oct. 13, 2016

(30) Foreign Application Priority Data
Nov. 28, 2013 (EP) .................... 13194776

(51) Int. Cl.
*A47J 31/44* (2006.01)
*A47J 31/60* (2006.01)

(52) U.S. Cl.
CPC ....... *A47J 31/4485* (2013.01); *A47J 31/4489* (2013.01); *A47J 31/60* (2013.01)

(58) Field of Classification Search
CPC .................................................. A47J 31/4489
(Continued)

(56) References Cited

U.S. PATENT DOCUMENTS 6,253,667 B1 7/2001 Lussi
6,289,796 B1 9/2001 Fung
(Continued)

FOREIGN PATENT DOCUMENTS

EP 0243326 A2 10/1987
EP 0803220 A1 10/1997
(Continued)

*Primary Examiner* — Reginald L Alexander

(57) ABSTRACT

The beverage frothing device comprises a first beverage passageway comprised of: a first beverage suction chamber (13) in communication with a first beverage suction duct (17) and a first steam inlet duct (21), wherein the first beverage suction duct is configured for communication with a beverage container; an air inlet port (27A); a frothing arrangement for mixing beverage delivered through the first beverage suction duct (17) with air from the air inlet port (27A) and producing frothed beverage; a first beverage dispensing spout (31), wherefrom frothed beverage is dispensed. The beverage frothing device further comprises a second beverage passageway comprised of a second beverage suction chamber (15) in communication with a second beverage suction duct (19) and a second steam inlet duct (23), wherein the second beverage suction duct is configured for communication with the beverage container. A steam feeding arrangement is further provided, which is configured for dispensing steam selectively to the first steam delivery duct (21), for producing frothed beverage, or to the second steam delivery duct (23) for producing hot, unfrothed beverage.

11 Claims, 11 Drawing Sheets

(58) Field of Classification Search
USPC ........ 99/293, 323.1, 455, 453; 261/DIG. 16, 261/DIG. 76, 142
See application file for complete search history.

(56) References Cited

U.S. PATENT DOCUMENTS

| | | |
|---|---|---|
| 8,646,380 B2 | 2/2014 | Mueller |
| 2008/0022860 A1 | 1/2008 | Turpin |
| 2010/0064900 A1 | 3/2010 | Reyhanloo |
| 2010/0147158 A1 | 6/2010 | Muller |
| 2011/0072977 A1 | 3/2011 | Mahlich |
| 2011/0100230 A1 | 5/2011 | Cheng |
| 2011/0192287 A1 | 8/2011 | Riessbeck |
| 2012/0118164 A1* | 5/2012 | Tonelli ................ A47J 31/4485 99/280 |
| 2015/0223633 A1 | 8/2015 | Stutz |

FOREIGN PATENT DOCUMENTS

| | | |
|---|---|---|
| EP | 2050368 A1 | 4/2009 |
| EP | 2236061 A1 | 10/2010 |
| JP | 5282234 U | 6/1977 |
| JP | 2006284145 A | 10/2006 |
| WO | 2011158171 A1 | 12/2011 |

\* cited by examiner

BEVERAGE FROTHING DEVICE AND JUG COMPRISING SAID DEVICE

This application is the U.S. National Phase application under 35 U.S.C. § 371 of International Application No. PCT/EP2014/075529, filed on Nov. 25, 2014, which claims the benefit of International Application No. 13194776.4 filed on Nov. 28, 2013. These applications are hereby incorporated by reference herein.

FIELD OF THE INVENTION

The invention relates to beverage-producing devices and accessories. More specifically, the invention relates to improvements concerning beverage frothing devices, in particular milk frothing devices and jugs provided with milk frothing devices. The invention further relates to beverage-producing machines including frothing devices.

BACKGROUND OF THE INVENTION

Beverage-producing machines, for example coffee and espresso producing machines, are often provided with a device for the production of frothed milk or hot milk. A milk frothing device usually comprises a milk suction chamber wherein a steam delivery nozzle delivers a flow of pressurized steam generated by a steam generator in the beverage-producing machine. A milk suction duct is in fluid communication with a milk container and with the milk suction chamber. A flow of hot, pressurized steam flowing through the milk suction chamber generates, by Venturi effect, a negative pressure in the milk suction chamber so that milk is sucked through the milk suction duct, mixed with the steam and heated by the latent vaporization heat contained in the steam, which is condensed in the milk flow. An air inlet port is further provided, in fluid communication with the milk suction chamber, so that an adjustable amount of air can be sucked into the milk path, if desired. The milk can thus be emulsified with air to produce frothed milk. An adjustable pin is usually provided, for adjusting the cross section of the air inlet port and thus the amount of froth. If the air inlet port is entirely closed by the pin, no air is sucked into the milk path and hot, unfrothed milk is generated. A frothing device of this kind is disclosed for example in EP0243326.

Milk frothing devices of this kind are efficient and flexible in use but suffer from same disadvantages mainly caused by the narrow cross section of the air inlet port. This causes often the risk of clogging of the air inlet port, for example due to milk entering the air inlet port.

In order to overcome these problems WO-A-2011/158171 discloses a novel kind of frothing device, wherein a large air passage or air inlet port is arranged along the milk path. The air inlet port is actually formed by an open space between two sequentially arranged pipes through which the milk flows. A large amount of air is entrained by the milk flow and is mixed with milk to generate milk froth. A cyclone chamber is arranged downstream the air inlet port for removing the excess of air from the frothed milk. This known device solves the problem of clogging of the air inlet port. However, this known device does not provide the same flexibility of use of other frothing devices, which are provided with an air adjusting pin. The lack of an air adjusting pin makes the device unsuitable for the production of hot, unfrothed milk.

SUMMARY OF THE INVENTION

According to a first aspect, the invention concerns a beverage frothing device comprising a first beverage passageway comprised of a first beverage suction chamber in fluid communication with a first beverage suction duct and a first steam inlet duct, a steam flow through the first inlet steam duct causing suction of the beverage through the first beverage suction duct; and wherein the first beverage suction duct is configured for establishing a fluid communication with a beverage container; an air inlet port; a frothing arrangement for mixing beverage delivered through the first beverage suction duct with air from the air inlet port and producing frothed beverage; and a first beverage dispensing spout, where from frothed beverage is dispensed. The device further comprises a second beverage passageway comprised of: a second beverage suction chamber in fluid communication with a second beverage suction duct and a second steam inlet duct, a steam flow through the second inlet steam duct causing suction of the beverage through the second beverage suction duct; and wherein the second beverage suction duct is configured for fluid communication with the beverage container. Moreover, the device also comprises at least one steam feeding arrangement, configured for receiving steam from a steam source and selectively feeding steam to the first steam inlet duct, for producing hot, frothed beverage, or to the second steam inlet duct, for producing hot, unfrothed beverage. For this purpose the steam feeding arrangement is arranged on a switching member, which can switch between a first position, for delivering steam from a steam entry aperture into the first steam inlet duct but not into the second steam inlet duct, and a second position, for delivering steam from the steam entry aperture into the second inlet duct, but not into the first steam inlet duct. The switching member further has a third switching position, wherein a fluid connection is established between the steam entry aperture and both the first and second steam inlet ducts, for cleaning purposes.

As will become apparent from the following description, the steam feeding arrangement can comprise one or more steam delivery nozzles.

The frothing arrangement can be comprised of a frothing chamber where the beverage is mixed with air to form a frothed beverage. For instance, the frothing arrangement can comprise an air suction chamber, in which air is sucked and intimately mixed with the beverage entering the air suction chamber. According to some embodiments, the beverage can be contacted with hot and pressurized steam before entering the air suction chamber, whereby the beverage is first heated and subsequently frothed by mixing with air in the air suction chamber. In other embodiments air and beverage can be mixed to obtain a frothed beverage, which is subsequently heated by mixing with hot steam. In yet further embodiments, air, steam and beverage can enter a single frothing chamber, wherein the three flows are mixed together, for heating and simultaneously frothing the beverage.

According to some particularly compact and efficient embodiments, the steam feeding arrangement comprises at least one steam delivery nozzle, selectively movable in at least a first position and a second position, and wherein the steam delivery nozzle is adapted for receiving steam from a steam source. In the first position the steam delivery nozzle is in fluid communication with the first steam inlet duct but not with the second steam inlet duct, for producing frothed beverage. In the second position the steam delivery nozzle is in fluid communication with the second steam inlet duct, but not with the first inlet duct, for producing hot, unfrothed beverage.

The frothing device is thus capable of dispensing alternatively a hot and frothed beverage, or a hot, unfrothed beverage, without the need for a valve or shutter closing the air inlet aperture. The latter can thus be designed with a relatively large cross-section, which prevents clogging due to accumulation of beverage residues. The first beverage dispensing spout can be designed as a cyclone or equivalent, to remove excess air from the flow of frothed beverage, as known in the art.

In some embodiments the unfrothed beverage can be dispensed from the same first beverage dispensing spout, wherefrom the frothed beverage is dispensed.

According to preferred embodiments, the second beverage passageway comprises a second beverage dispensing spout, wherefrom unfrothed milk is dispensed. The first beverage dispensing spout and the second beverage dispensing spout can be designed so that when frothed beverage is produced, the frothed beverage is prevented from entering in the second beverage dispensing spout, due e.g. to cyclone effect provided by the first beverage dispensing spout. For example the outlet aperture of the second beverage dispensing spout can be protected by a partition wall or any other suitable arrangement, preventing the frothed beverage flow, which is dispensed though the first beverage dispensing spout, from entering the second beverage dispensing spout. In some embodiments the first beverage dispensing spout and the second beverage dispensing spout can be arranged side by side, with both outlet apertures thereof oriented downwardly.

According to some embodiments, the steam delivery nozzle can be arranged on a displaceable switching member, such that the steam delivery nozzle can be moved selectively in the various positions thereof by moving the switching member in corresponding switching positions. The switching member can be rotatable about a rotation axis to take one of the various selective switching positions. According to other embodiments, the switching member can be movable according to a translation rather than rotation movement. For instance, the switching member can be arranged on or formed by a slide. A rotary switching member is however preferred, as it results in a more compact construction of the frothing device. Additionally, a rotary switching member is easier to assemble and more reliable and robust. In some embodiments, the axis of rotation of the switching member is orthogonal to the steam delivery nozzle. In some embodiments, the switching member can comprise two or more steam delivery nozzles, which are selectively placed in fluid communication with a steam source and with either one, the other or both steam inlet ducts.

According to particularly advantageous embodiments the switching member further comprises a beverage feeding duct, which can be brought in fluid communication selectively: with the first beverage suction duct, when steam is delivered to the first steam inlet duct; and with the second beverage suction duct, when steam is delivered to the steam inlet duct. A flexible pipe, for instance arranged co-axially with the rotation axis of the switching member, can be provided, extending inside a beverage container, for sucking beverage therefrom. With this arrangement, a single beverage suction pipe or duct can be provided, which is selectively placed in fluid communication with one or the other of the two beverage passageways. The selection is obtained by acting upon the switching member.

According to one or more further possible embodiments, two separate beverage feeding ducts can be provided, which are in fluid communication with the first beverage passageway and the second beverage passageway. The beverage is sucked through one or the other of said two beverage feeding ducts, depending upon which passageway is fed with pressurized steam.

In some embodiments the switching member has a third, washing position.

The switching member can include an additional steam or hot water delivery nozzle, configured to establish a flow connection between a steam source and both first and steam inlet ducts of the first and second beverage passageways. Steam or hot water delivered through the additional steam or hot water delivery nozzle is thus used for washing or cleaning the two beverage passageways.

According to other embodiments, one and the same steam delivery nozzle is used for selectively establishing a connection with the first or the second beverage passageways, alternatively, for producing hot, frothed beverage or hot, unfrothed beverage or for establishing a simultaneous connection between the steam source and both first and second beverage passageways for cleaning or washing purposes. In this third possible position, steam or hot water can be delivered through the device for cleaning the components thereof which are in contact with the beverage, e.g. milk.

In some embodiments the steam delivery nozzle can be provided with a first end opening and a second end opening. The first end opening is in fluid communication with a steam distribution chamber integrally movable with the switching member and having a dimension in the direction of displacement of the switching member, such that in both the first switching position and the second switching position the steam distribution chamber is in fluid communication with a steam entry aperture, to establish a flow connection between the steam entry aperture and the first steam inlet duct or the second steam inlet duct, selectively. The second end opening of the steam delivery nozzle has a cross section which is sufficiently small for establishing a flow connection with only one or the other, selectively, of the first steam inlet duct and the second steam inlet duct, depending upon the position of the switching member. With this arrangement, by shifting the switching member, steam or water can be caused to flow simultaneously through the two beverage passageways when the switching member is in the third, washing or cleaning position. Additionally, steam can be caused to selectively flow through the first or the second beverage passageways when the switching member is arranged in one or the other of the first and second, beverage-producing positions.

As mentioned above, in other embodiments, the switching member can be provided with more than just one steam delivery nozzle, for instance two steam delivery nozzles, which are placed selectively in fluid communication with either one or the other or both the beverage passageways and with a steam entry aperture. For example the switching member can be provided with a translation movement from a first switching position where a first steam delivery nozzle establishes a connection between a steam entry aperture and a first one of said two beverage passageways, to a second switching position where a second steam delivery nozzle establishes a connection between the steam entry aperture and a second one of said two beverage passageways. A third steam delivery nozzle can be provided, to establish a simultaneous connection between the steam entry aperture and both beverage passageways when the switching member is in the third, cleaning position.

The movement of the switching member can be manual or controlled by an actuator.

In some embodiments the switching member can act upon a sensing arrangement provided on a beverage-producing machine, whereto the frothing device is mounted or interfaced. The beverage-producing machine is thus able to detect in which position the switching member is moved by the user. For example, the beverage-producing machine can be provided with capacitive sensors, micro-switches or other sensing devices, co-acting with the switching member, to detect the position thereof.

Based on the sensed position, the beverage-producing machine can be controlled so as to perform the correct cycle. For instance, if the beverage-producing machine is a coffee machine, the switching member can cause the coffee machine to switch in a hot-milk production mode, when the steam delivery nozzle is in fluid communication with the second beverage passageway. Alternatively, the switching member can cause the coffee machine to switch in a cappuccino-production mode when the steam delivery nozzle establishes a connection with the first beverage passageway. When the switching member is provided with a third, washing position, the coffee producing machine can be automatically switched in a cleaning mode, when the switching member is placed in the third position.

In some embodiments, washing can be performed by delivering steam or hot water or both through the beverage passageways.

In some embodiments, the switching member can be configured so that when the switching member is in the third, washing position the first beverage suction duct and the second beverage suction duct are closed by a shutter integrally movable with the switching member. In other embodiments a separate shutter closes the first and second beverage suction ducts.

Generally speaking the frothing device can be designed as an add-on component for a beverage-producing machine, e.g. a coffee machine, or as an inner component of such a machine. In this case the beverage to be heated or frothed can be sucked from a container, the machine is provided with, or even directly from a beverage package, e.g. a milk carton.

In other, currently preferred embodiments, the beverage frothing device can be integrated in a beverage jug. For instance, the frothing device can be housed in, or supported by a cover of a jug.

According to a further aspect, the invention concerns a beverage-producing machine comprising a steam delivery line and a beverage frothing device as described above, which is connectable to the steam delivery line, to establish a fluid communication between the steam delivery line and the steam delivery nozzle of the beverage frothing device.

Further features and advantages of the invention are set forth in the following description of exemplary embodiments thereof and in the enclosed claims, which form an integral part of the present description.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings.

DETAILED DESCRIPTION OF EMBODIMENTS

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Herein below reference will be specifically made to a milk frothing device. Such device can usefully be combined with a milk jug and a coffee machine. It shall however be understood that the frothing device and the features thereof can be used also for frothing a different beverage, i.e. any edible liquid or substantially liquid product, which can be frothed by mixing it with air and/or which can be heated by contacting the beverage with a stream of hot steam.

In the embodiment disclosed herein the milk frothing device is combined with a milk jug and more specifically is arranged in a cover of the milk jug. In other embodiments, not shown, the milk frothing device can be in the form of a separate component to be applied directly to a beverage-producing machine on one side and to a separate milk container on the other.

Moreover, in the following description reference will be made to a milk frothing device which can be switched between the several operating positions with a manual switching system. In other embodiments, not shown, an actuator can be provided for selecting the position of the frothing device.

Figure 1:
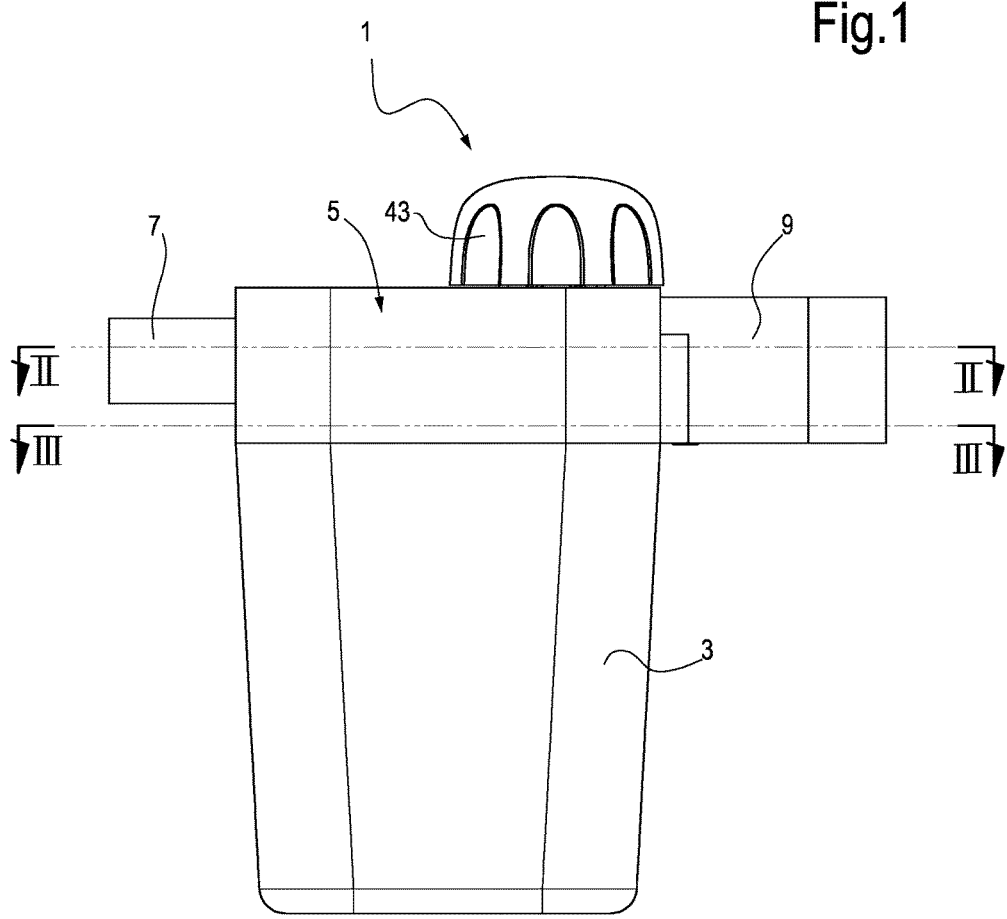
FIG. 1 illustrates a side view of a jug, wherein a milk frothing device according to the invention is arranged.
Figure 12:
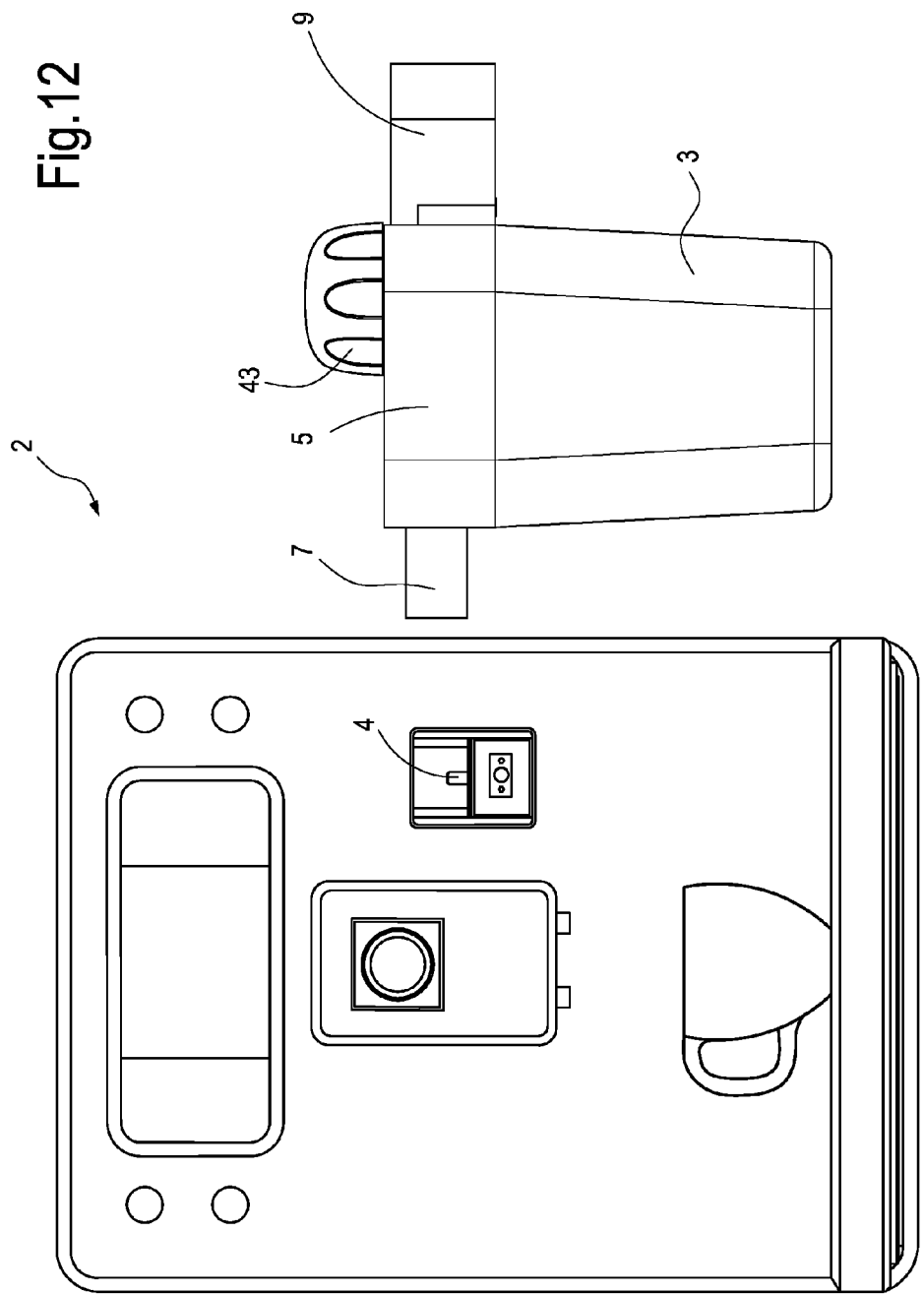
FIG. 12 illustrates a coffee machine with a steam delivery line where to a jug with a frothing device can be connected.

FIG. 1 shows a side view of a milk jug 1 containing a milk frothing device according to the invention. In this embodiment, the milk jug 1 comprises a jug body 3 and a jug cover 5. The jug cover 5 can have a projection 7 forming a steam connector for connecting the jug to a beverage-producing machine, for example a coffee machine or an espresso machine (not shown), which is provided with a steam delivery line. The steam connector is fluidly connected to a steam circuit arranged in the jug cover 5 and described in greater detail later on. As shown in FIG. 12, the milk jug 1 can be connected to a beverage-producing machine 2, for instance coffee producing machine. The beverage-producing machine 2 can be provided with a steam delivery line 4.

Opposite the projection 7, the jug 1 can be provided with a nose 9, wherefrom hot, frothed or unfrothed milk is dispensed. According to some embodiments, not shown, the nose 9 or the projection 7 can be pivotally mounted on the jug, so as to orient them according to needs, e.g. in order to place the nose 9 above a cup placed under the coffee dispensing nozzle of the machine 2. In yet further embodiments, the nose 9 and the projection 7 can be oriented at an angle different from 180°, e.g. at 90° or 120°.

Referring now to FIGS. 2, 3 and 8 to 11, the main features of a frothing device 11 housed in the jug cover 5 will be described.

In some embodiments the milk frothing device 11 comprises a first milk suction chamber 13 and a second milk suction chamber 15. The first milk suction chamber 13 is in fluid communication with a first milk suction duct 17. The second milk suction chamber 15 is in fluid communication with a second milk suction duct 19.

The first milk suction chamber 13 is moreover connected to a first steam inlet duct 21 and the second milk suction chamber 15 is connected to a second steam inlet duct 23. As will be described in greater detail here below, steam can be selectively fed through one or the other of the first steam inlet duct 21 and the second steam inlet ducts 21, 23. A switching arrangement is provided for switching the steam flow accordingly. Pressurized steam flowing through the first steam inlet duct 21 or the second steam inlet duct 23 causes suction of the milk in the respective first or second milk suction chamber 13 and 15 by Venturi effect.

In the exemplary embodiment shown in the drawings the two milk suction ducts 17 and 19 have substantially the same shape and cross-section. This, however, is not essential. In one or more alternative embodiments the first and second milk suction ducts 17 and 19 can have different shapes and/or dimensions, e.g. to take into account the different behavior of the steam flow in the two beverage passageways. For example, in some exemplary embodiments the second milk suction duct 19 can have a narrower cross-section so that less milk is sucked for the same amount of steam and a sufficiently high milk temperature is achieved.

Moreover, the first milk suction chamber 13 is connected to an air suction chamber 27 through a port 25 and, to a first milk dispensing spout 31 through a duct 29. The first milk suction chamber 13, the port 25, the duct 29 and the first milk dispensing spout 31 form a first milk passageway, designed and arranged for producing and dispensing hot and frothed milk. The milk frothing device thus formed operates in quite the same manner as the device disclosed in WO-A-2011/158171, whereto reference can be made for additional details. More specifically, milk sucked by the steam flowing through the first steam inlet duct 21 is heated by mixing with the steam. The steam is condensed and the heated milk flow enters the air suction chamber 27, where it frothed milk is formed by mixing milk and air. The air suction chamber 27 thus forms part of a milk frothing arrangement, in which the milk is heated and frothed with air.

Figure 10:
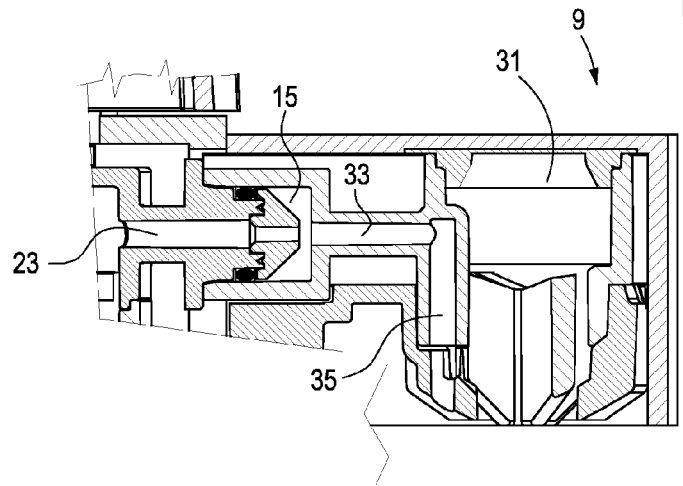
Figure 11:
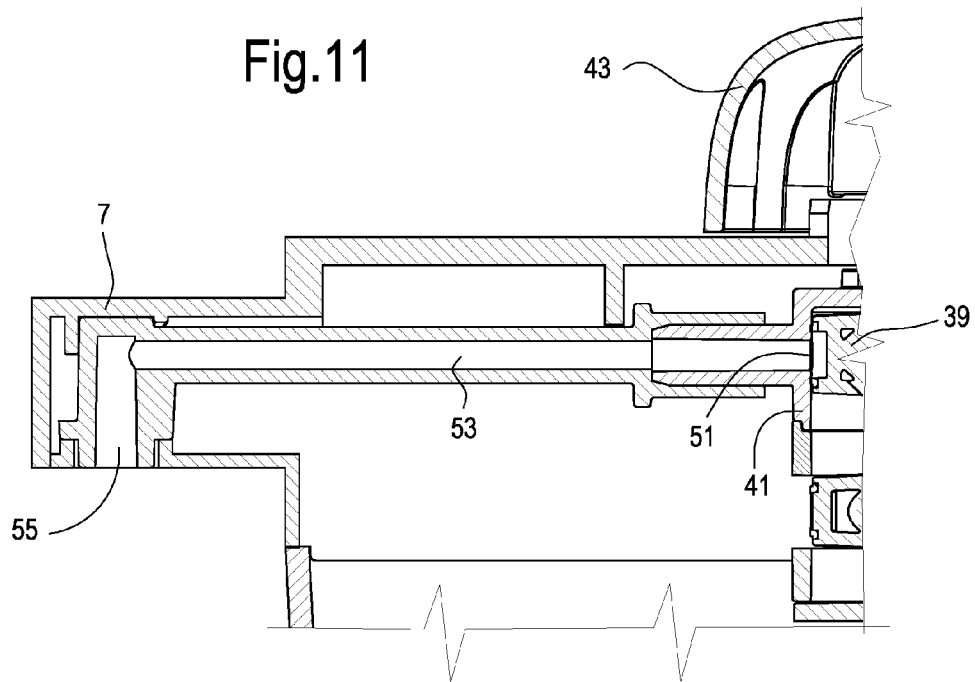

The second milk suction chamber 15 is connected, through a hot milk duct 33, to a second milk dispensing spout 35 (see also FIG. 10). The second milk suction chamber 15, the hot milk duct 33 and the second milk dispensing spout 35 define a second milk passageway.

In some embodiments, in order to selectively dispense steam to either one or the other of the first steam inlet duct 21 and the second steam inlet ducts 23, a steam delivery nozzle 37 can be provided upstream of the first steam inlet duct 21 and second steam inlet duct 23. According to some embodiments, the steam delivery nozzle 37 is supported by a displaceable switching member 39. The switching member 39 can be provided with a rotary movement around a vertical axis A. the switching member 39 can be rotatingly housed in a seat 41 provided in the cover 5 of the milk jug 1. Movement of the switching member can be controlled manually, e.g. by means of a switching knob 43 projecting from the jug cover 5. The switching member can co-act with sensing means or devices provided on board of a beverage-producing machine, e.g. capacitive sensors, micro-switches or the like. In this way the position of the switching member can be sensed by the beverage-producing machine, such that by acting upon the switching member the user can simultaneously provide instructions to the beverage-producing machine, e.g. useful for the selection of the proper operating cycle.

In one or more further embodiments, not shown, the switching member can be operated by means of an actuator, rather than manually.

In yet further embodiments the switching member can be provided with a translation rather than rotary motion. It is also possible for the switching member 39 to be provided with more than one steam delivery nozzle 37. The movement of the switching member can then move one or the other of two or more steam delivery nozzles with one or the other of the two steam inlet ducts 21, 23. A further steam delivery nozzle can be provided for cleaning or washing purposes.

Figure 2:
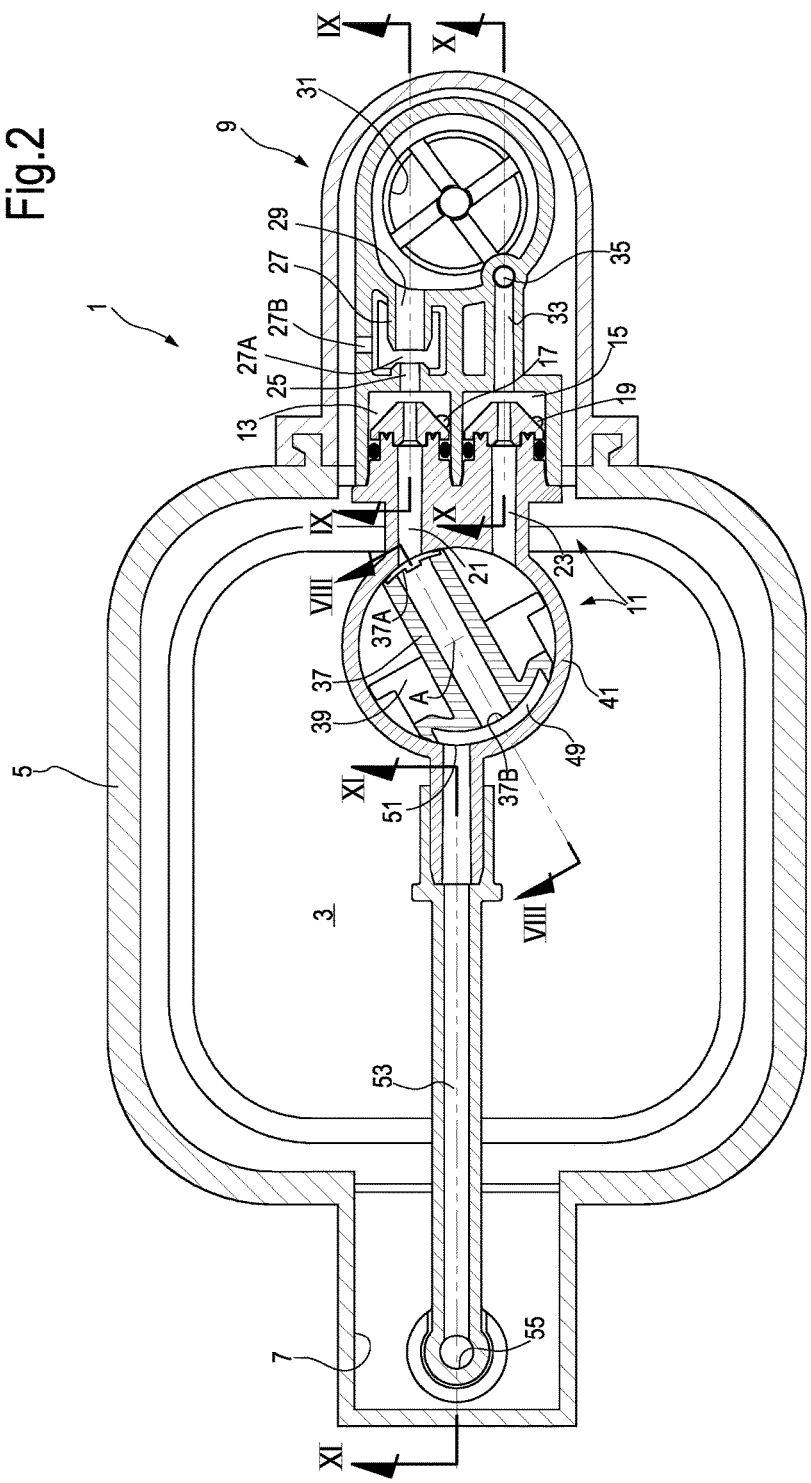
FIGS. 2 and 3 illustrate cross-sections according to lines II-II and III-III in FIG. 1, with the milk frothing device in a first operating position.
Figure 4:
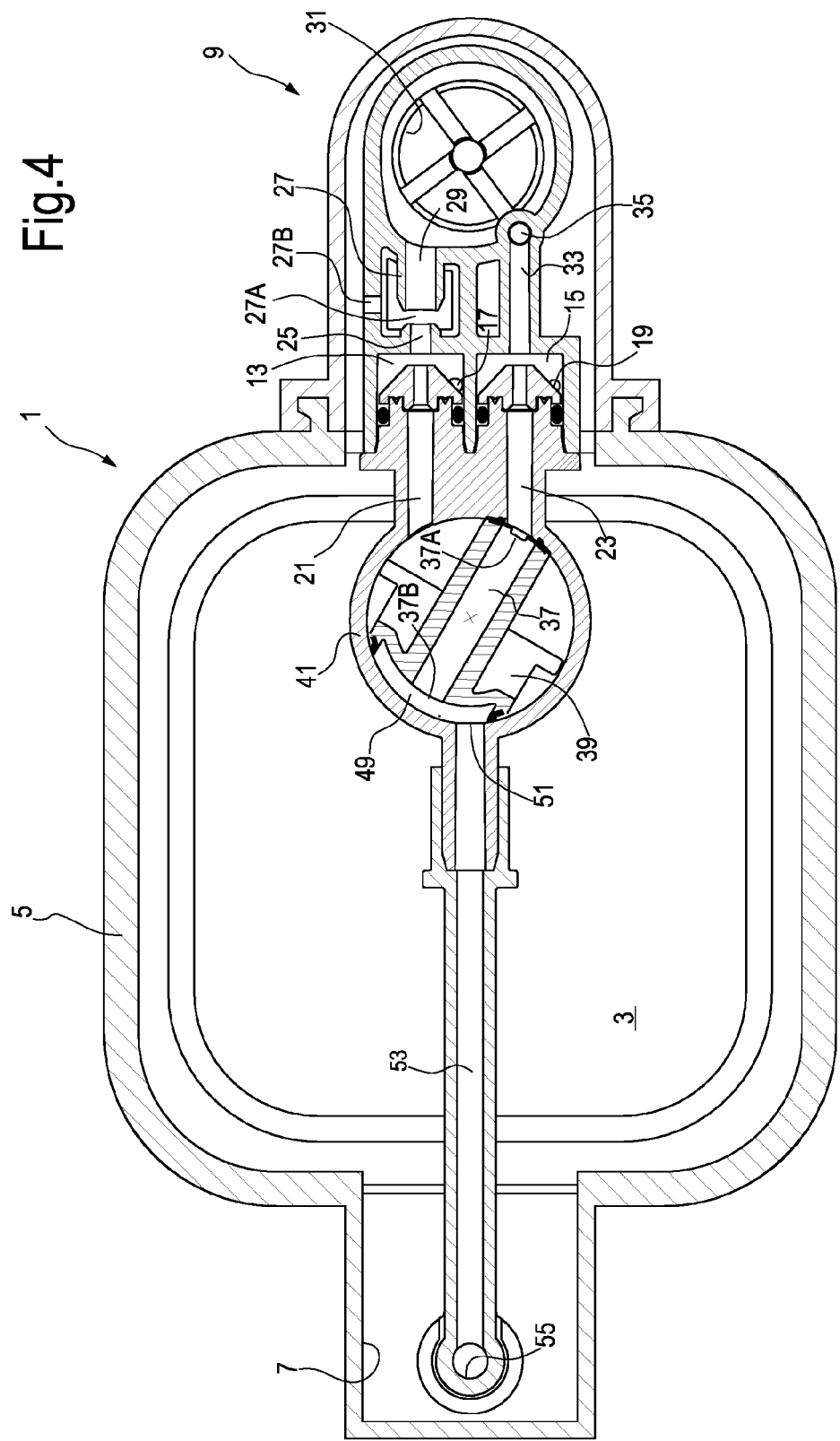
FIGS. 4 and 5 illustrate cross-sections similar to FIGS. 2 and 3 with the frothing device in a second operating position.
Figure 6:
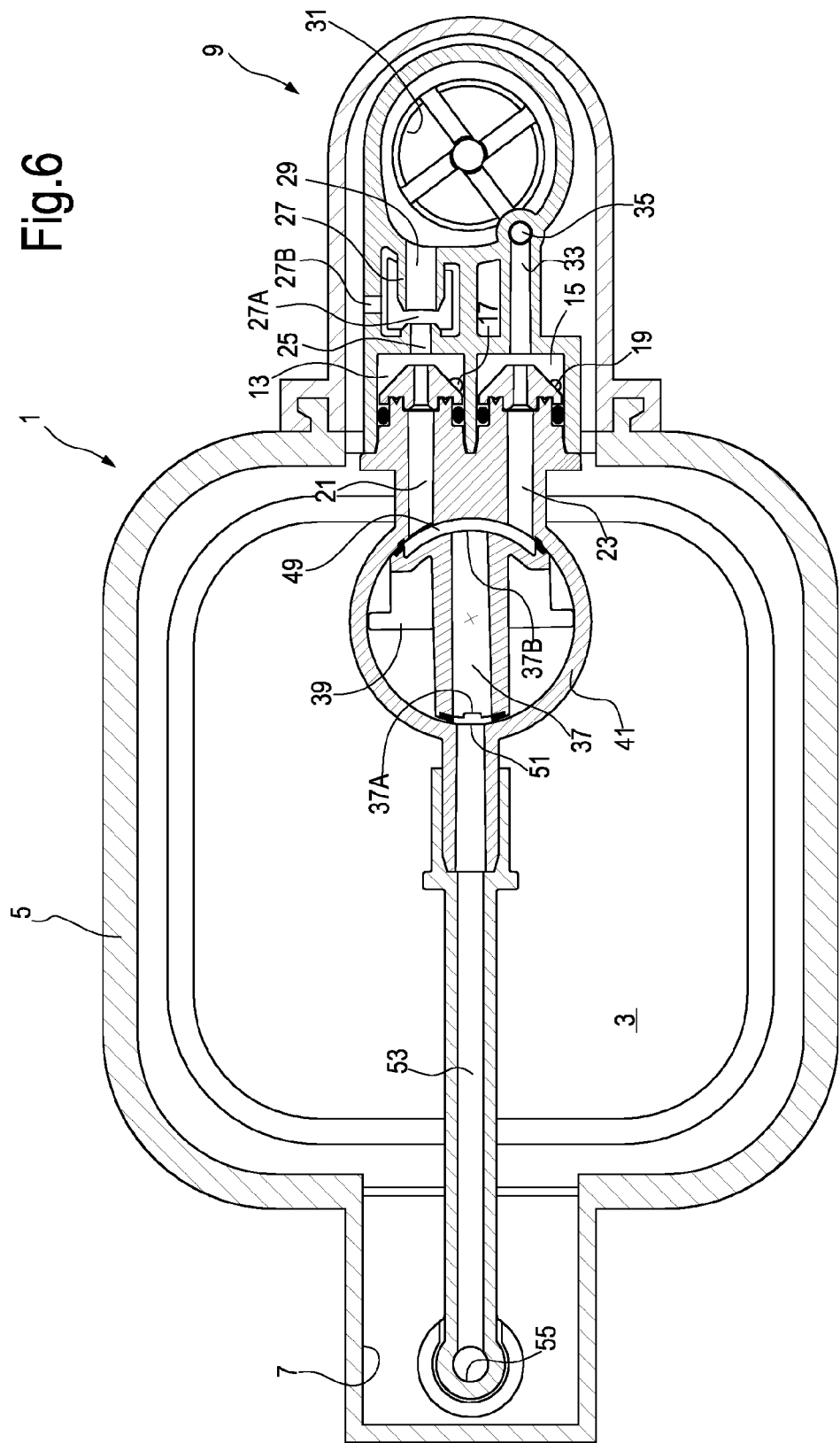
FIGS. 6 and 7 illustrate cross-sections similar to FIGS. 2 and 3 with the milk frothing device in a third operating position.

The steam delivery nozzle 37 can be selectively switched in any one of the three positions shown in FIGS. 2, 4 and 6, respectively, by angularly displacing the switching member 39. In FIG. 2 the steam delivery nozzle 37 is in fluid communication with the steam inlet duct 21, while in FIG. 4 the steam delivery nozzle 37 is in fluid communication with the steam inlet duct 23. When the steam delivery nozzle 37 is in the angular position shown in FIG. 2, steam is delivered in the milk suction chamber 13 to heat milk and dispense hot, frothed milk through the first milk passageway and the first milk dispensing spout 31. In the position shown in FIG. 4 hot, unfrothed milk is produced and dispensed through the second milk dispensing spout 35.

In some embodiments, the steam delivery nozzle 37 has a first end opening 37A and a second end opening 37B. The first end opening 37A has a cross section which is dimensioned so that when the steam delivery nozzle is either in the position of FIG. 2 or in the position of FIG. 4, steam can be delivered to the first steam inlet duct 21 or to the second steam inlet duct 23 only, i.e. the first end opening 37A allows interfacing the steam delivery nozzle 37 with only one of the first and second steam inlet duct 21, 23 at a time.

The second end opening 37B is in fluid communication with a steam distribution chamber 49, which is integral with the steam delivery nozzle. As can be seen in FIGS. 2 and 4, the dimension or extension of the steam distribution chamber 49 in the direction of the movement of the displaceable switching member and of the steam delivery nozzle 37 is such that in both of the two positions shown in FIGS. 2 and 4, respectively, the steam distribution chamber 49 is in fluid communication with a steam entry aperture 51. The steam entry aperture 51 can be provided in the wall of the seat 41 housing the displaceable switching member. The steam entry aperture 51 is connected through a steam pipe 53 a connector 55, provided in the projection 7. The connector 55 can be placed in fluid communication with a steam delivery line of a steam producing machine or a beverage-producing machine (not shown), wherefrom steam is delivered to the milk frothing device 11.

The third position of the steam delivery nozzle 37 and of the displaceable switching member 39 supporting the steam delivery nozzle 37 is shown in FIG. 6. In this third position the steam delivery nozzle 37 is oriented so that the first end opening 37A faces the steam entry aperture 51, while the steam distribution chamber 49 faces the entrance of the first steam inlet duct 21 and the second steam inlet duct 23. The steam distribution chamber 49 spans from the first steam inlet duct 21 to the second steam inlet duct 23. Thus, in this position a fluid communication is established between the steam entry aperture 51 and both the first and second steam inlet ducts 21, 23.

Figure 3:
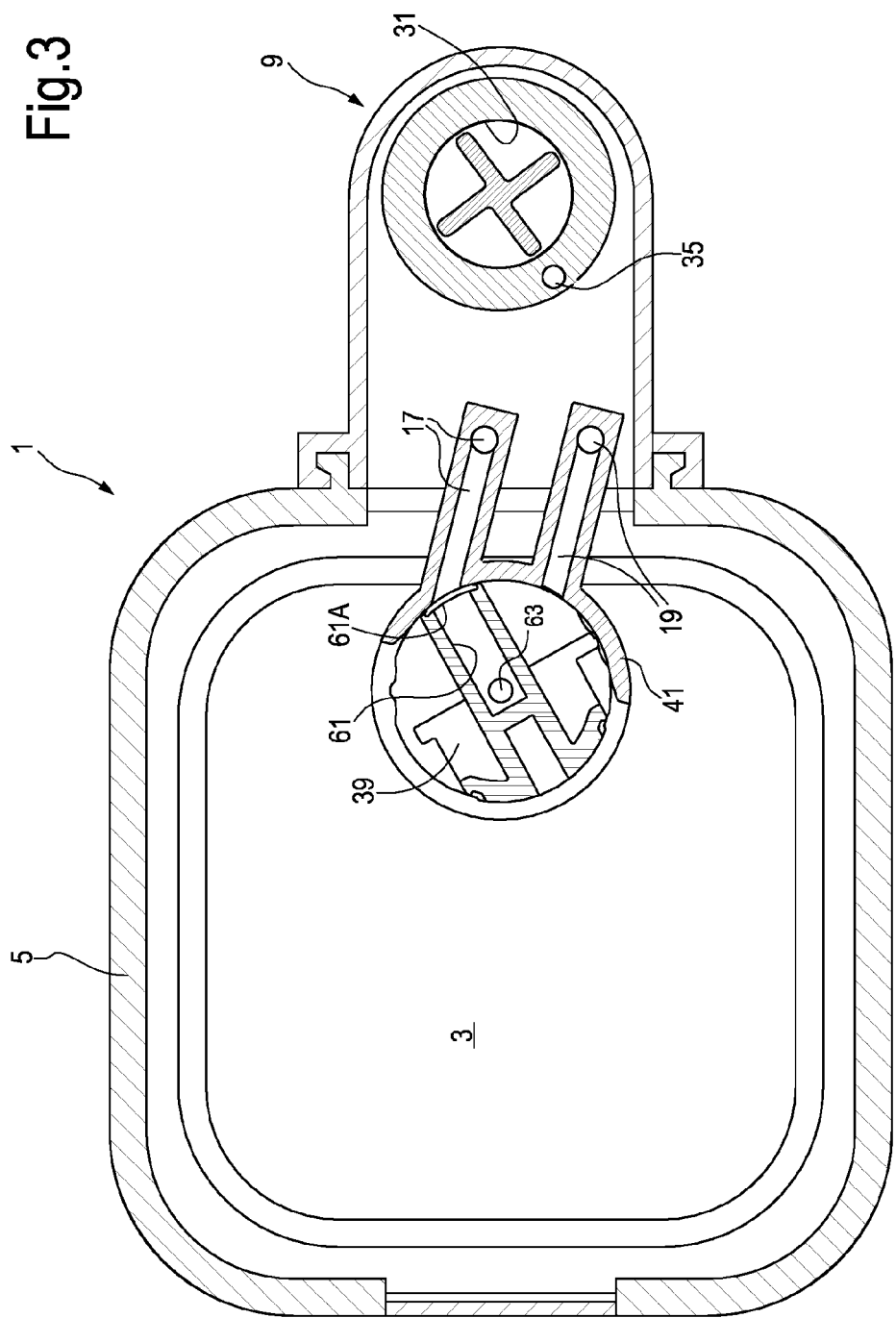
Figure 5:
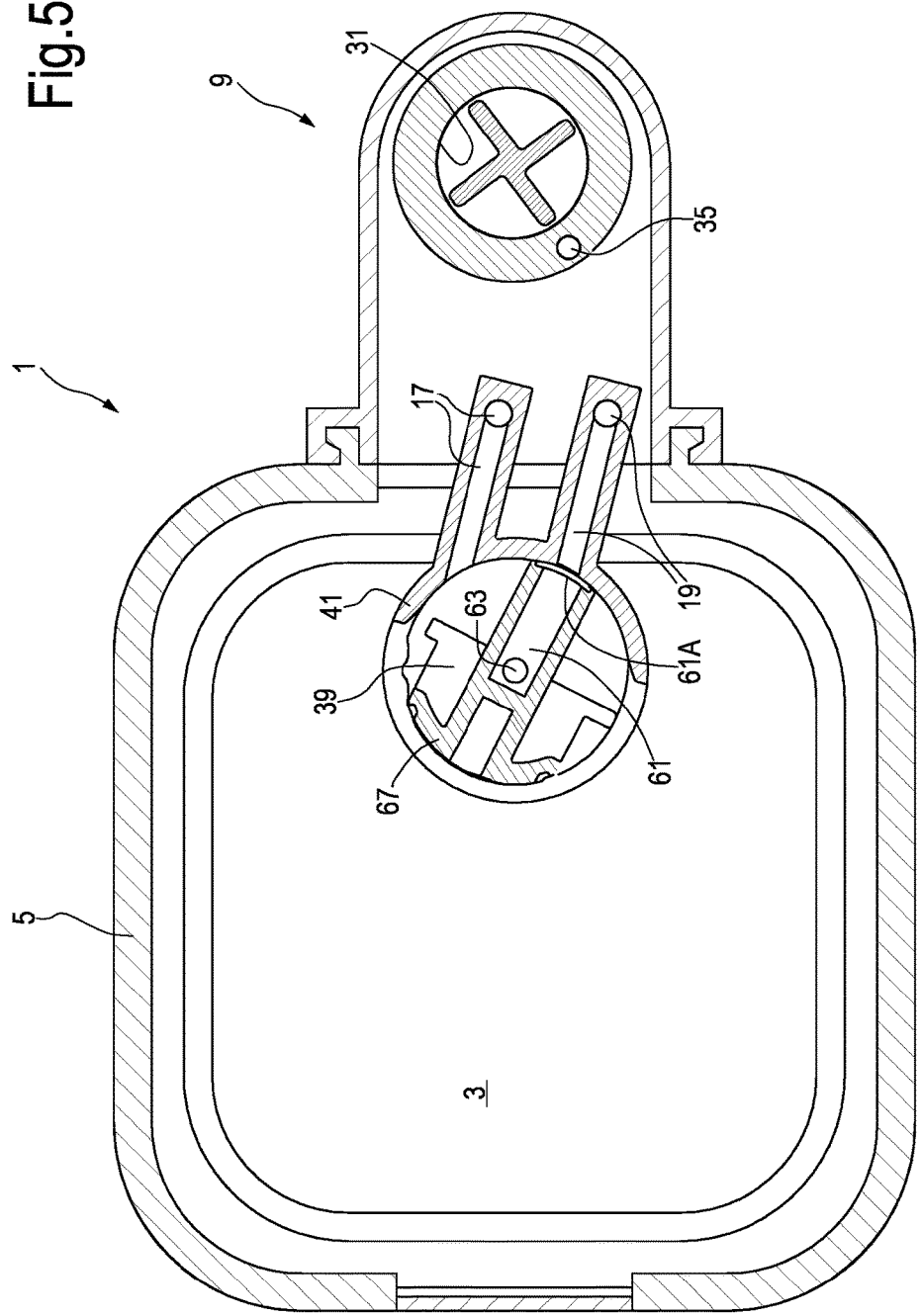

According to some embodiments, as shown in FIGS. 3, 5, 7 and 8, the displaceable switching member 39 is provided with a milk feeding duct 61, which is positioned under the steam delivery nozzle 37. The milk feeding duct 61 has an opening 61A which can be put in fluid communication selectively with the first milk suction duct 17 and with the second milk suction duct 19, respectively, as best shown in FIGS. 3 and 5. In FIG. 3 the milk feeding duct 61 is in communication with the first milk suction duct 17 and the steam delivery nozzle 37 is in fluid communication, through the first end opening 37A, with the first steam inlet duct 21. Conversely, in the position of FIG. 5, where the steam delivery nozzle 37 is in communication through the first end opening 37A with the second steam inlet duct 23, the milk feeding duct 61 is in fluid communication with the second milk suction duct 19.

Figure 8:
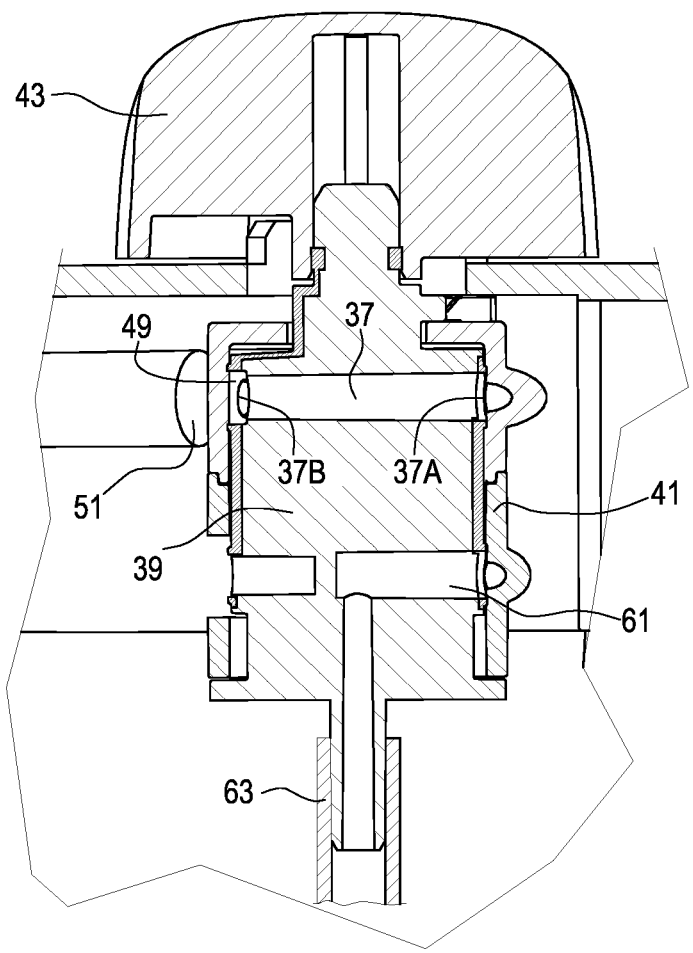
FIGS. 8, 9, 10 and 11 illustrate sections according to lines VIII-VIII, IX-IX, X-X and XI-XI of FIG. 2, respectively.
Figure 9:
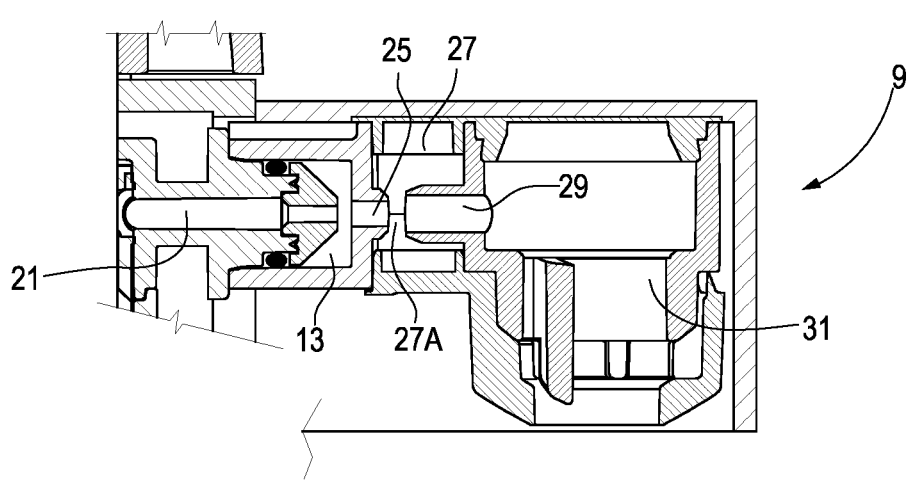

The milk feeding duct 61 is connected to a milk suction pipe 63, shown in particular in FIG. 8. The milk suction pipe 63 can be a flexible pipe which can extend towards the bottom of the jug body 3.

By providing the milk feeding duct 61 on the switching member 39, a single milk suction pipe 63 can be provided for sucking milk from the jug and feeding the milk to the first or second milk suction ducts 17, 19. Moreover, by providing a closure member or stopper 67 (see FIGS. 5 and 7) on the switching member 39, the milk suction ducts 17, 19 can be isolated from the milk suction pipe 63, for example for cleaning or washing purposes, as will be described later on.

In one or more alternative embodiments, the two milk suction ducts 17, 19 can extend into the milk jug separately and dip in the milk. For example, flexible pipes can be attached to the ducts 17, 19, each pipe extending down towards the bottom of the jug body 3. If the device is provided with a cleaning or washing position, as described here below, the switching member 39 can be configured for closing the suction ducts 17, 19 when the switching member 39 is moved to the washing position.

The milk frothing device described so far can operate in there different modes depending upon the position taken by the displaceable switching member 39 and by the steam delivery nozzle 37 supported thereby. The three operating modes will be described in greater detail here below.

When the milk frothing device 11 is arranged in the position shown in FIGS. 2 and 3, hot, frothed milk can be produced as follows. A stream of hot pressurized steam from a beverage-producing machine or the like flows into the milk frothing device through connector 55 and steam pipe 53. The steam flow enters the steam distribution chamber 49 and flows through the steam delivery nozzle 37 reaching the first steam inlet duct 21.

The steam flow thus enters the first milk suction chamber 13 generating a low pressure therein. The low pressure (under the atmospheric pressure) generated in the first milk suction chamber 13 causes milk to be sucked through milk suction pipe 63, milk feeding duct 61 and first milk suction duct 17 into the first milk suction chamber 13. In the first milk suction chamber 13 milk is mixed with steam and heated. Hot milk flows from the first milk suction chamber 13 through the port 25 in duct 29 and is frothed by means of air sucked through the air suction chamber 27. Air can enter in the air suction chamber 27 e.g. through one or more ports 27B formed in the walls surrounding the air suction chamber 27. Air is entrained by the milk flow through an open space 27A left between the port 25 and the duct 29, said open space forming an air inlet port. Hot, frothed milk is then dispensed through the first milk dispensing spout 31 in a cup or other suitable container which can be placed under the nose 9. Additional details on the operation of the frothing arrangement can be found in WO-A-2011/158171.

When the milk frothing device 11 is switched in the position shown in FIGS. 4 and 5, steam entering through connector 55, duct 53 and steam entry aperture 51 is delivered through the steam delivery nozzle 37 in the second steam inlet duct 23 to generate suction in the second milk suction chamber 15.

In the second milk suction chamber 15 milk is mixed with steam and heated. Hot, unfrothed milk is then dispensed through hot milk duct 33 and through the second milk dispensing spout 35 in a cup or other receiving container.

By properly selecting the position of the displaceable switching member 39, therefore, the frothing device can selectively produce hot, frothed milk or hot, unfrothed milk respectively.

Figure 7:
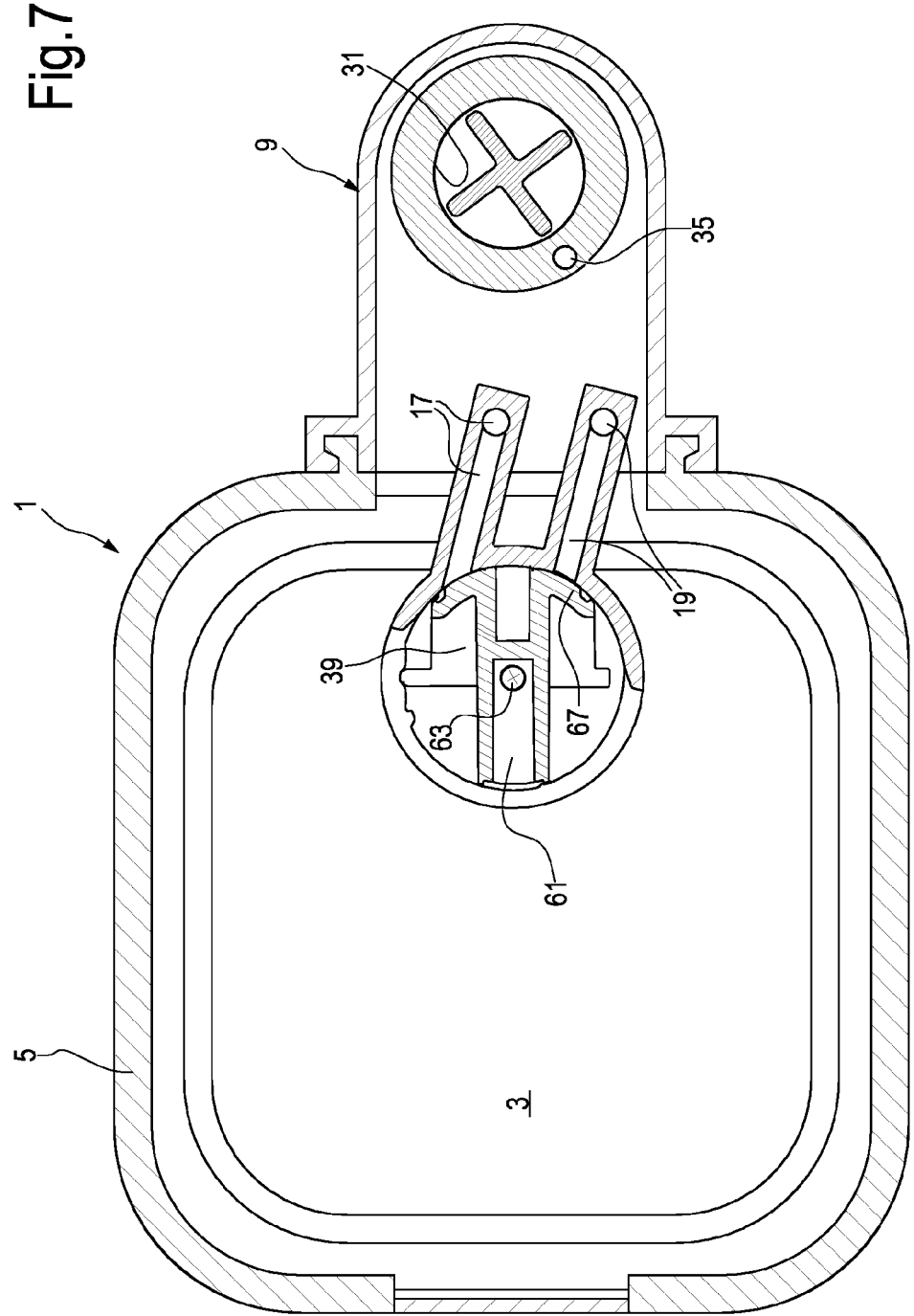

The third position of the displaceable switching member 39, shown in FIGS. 6 and 7 is provided for cleaning or washing purposes. In this third position the first end opening 37A of the steam delivery nozzle 37 is facing the steam entry aperture 51, while the steam distribution chamber 49 faces the first steam inlet duct 21 and the second steam inlet duct 23, establishing a fluid connection between both said first and second steam inlet ducts 21, 23 and the steam delivery nozzle 37. The milk feeding duct 61 is rotated so that an optionally provided stopper or closure member 67, formed on the displaceable switching member 39, closes both the first milk suction duct 17 and the second milk suction duct 19.

When steam flows through the milk frothing device 11 in this third position, no milk is sucked from the jug body 3, since the milk feeding duct 61 is not in fluid communication with the steam path. The steam flows from both the first and second steam inlet ducts 21, 23 through both the first and second milk passageways cleaning them and removing milk residues, thus preventing the deterioration of milk in the milk frothing device 11, for example after use and before storing the milk jug in a refrigerator. Alternatively or in combination to steam, hot water can be dispensed through the milk frothing device. The washing cycle can be selected for example by the user acting upon the beverage-producing machine, whereto the frothing device is connected.

In the embodiment disclosed so far the frothing device is comprised of a steam feeding arrangement with a switching member 39, provided with a single steam delivery nozzle 37. The arrangement is such that the single steam delivery nozzle 37 can fluidly connect the steam entry aperture 51 with the first steam inlet duct 21 only, with the second steam inlet duct 23 only, or with both the first and the second steam inlet ducts 21, 23 to perform various functions, namely: producing a frothed and preferably hot beverage; producing a hot, unfrothed beverage; washing the beverage passageways.

The switching device 39 is a rotary switching device, resulting in a very compact and easy-to-use device.

Figure 13:
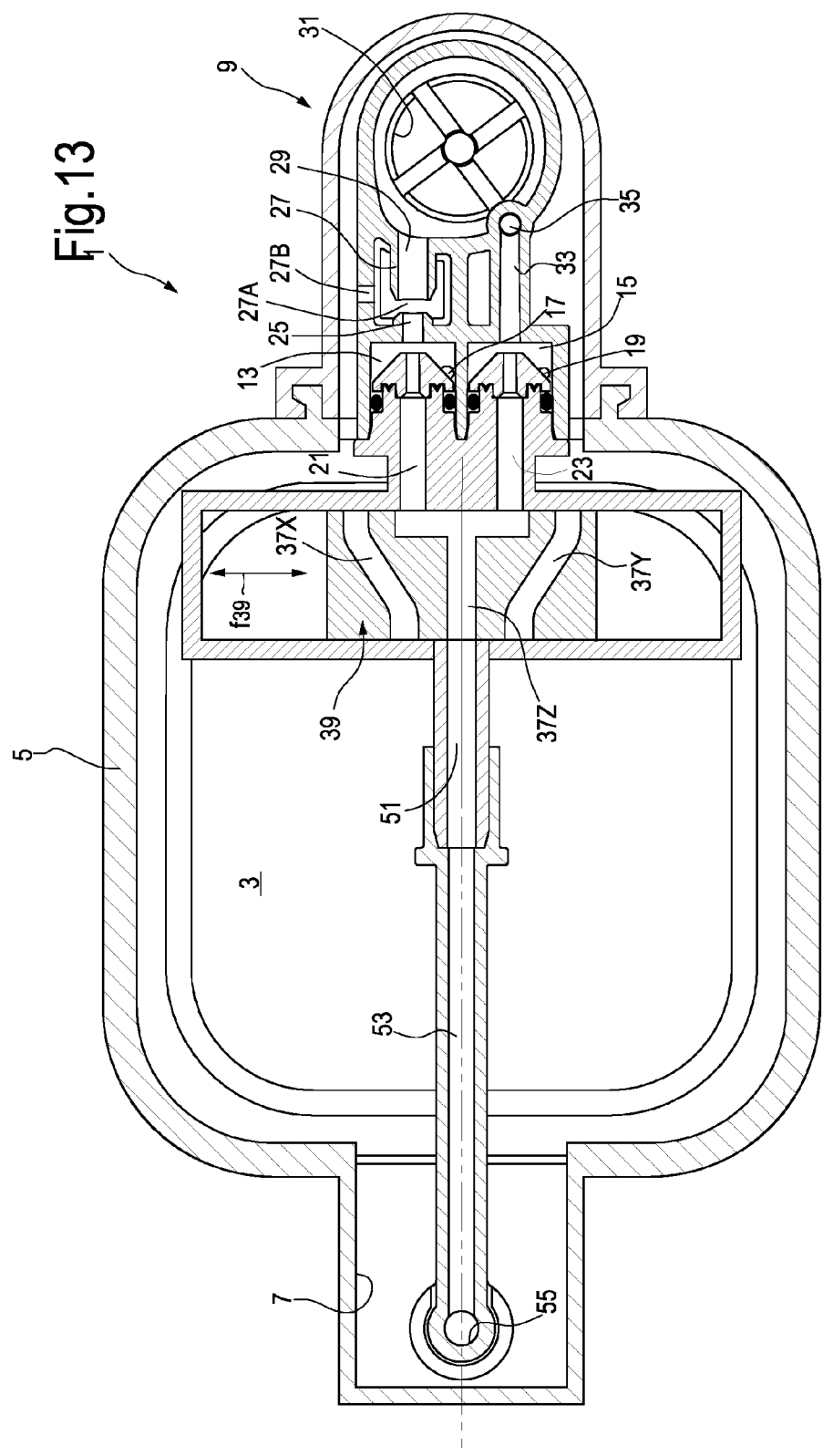
FIG. 13 illustrates a cross-section similar to FIG. 2 of a further embodiment of he device according to the invention.

Other embodiments are however possible. FIG. 13 illustrates a sectional view similar to FIG. 2 of a further exemplary embodiment of the device according to the invention. The same reference numbers designate the same or similar components, elements or parts, which will not be described again. In the embodiment of FIG. 13 a translating switching member 39 is provided, instead of a rotating one. The switching member 39 can move according to double arrow f39. In some embodiments the switching member 39 comprises a steam feeding arrangement comprised of a first steam delivery nozzle 37X, a second steam delivery nozzle 37Y and a third steam delivery nozzle 37Z. The steam delivery nozzles 37X, 37Y and 37Z are configured and arranged such that, depending upon the position of the switching member 39, a fluid connection can be established: between the steam entry aperture 51 and the first steam inlet duct 21, but not with the second steam inlet duct 23; or between the steam entry aperture 51 and the second steam inlet duct 23, but not with the first steam inlet duct 21; or between the steam entry aperture 51 and both the first and second steam inlet ducts 21, 23.

More specifically, in the intermediate position shown in FIG. 12, the switching member 39 is in such a position that the third, intermediate steam delivery nozzle 37Z fluidly connects both the first and second steam inlet ducts 21, 23 with the steam entry aperture 51.

By displacing the switching member 39 upwards (looking at FIG. 12), a fluid connection will be established through the second steam delivery nozzle 37Y between the steam entry aperture 51 and the second steam inlet duct 23, while the first steam inlet duct 21 will be isolated from the steam entry aperture 51.

By displacing the switching member 39 downwards (again looking at FIG. 12), a fluid connection will be established through the first steam delivery nozzle 37X between the steam entry aperture 51 and the first steam inlet duct 21, while the second steam inlet duct 21 will be isolated from the steam inlet aperture 51.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A beverage frothing device comprising:
a first beverage passageway comprising:
a first beverage suction chamber in communication with a first beverage suction duct and a first steam inlet duct, wherein the first beverage suction duct is configured to communication with a beverage container;
an air inlet port;
a frothing arrangement configured to:
mix a beverage delivered through the first beverage suction duct with air from the air inlet port; and
produce frothed beverage;
a first beverage dispensing spout, wherefrom the frothed beverage is dispensed;
a second beverage passageway comprising:
a second beverage suction chamber in communication with a second beverage suction duct and a second steam inlet duct, wherein the second beverage suction duct is configured to communication with the beverage container; a steam feeding arrangement arranged on a displaceable switching member that is selectively movable,
the steam feeding arrangement comprising:
a steam delivery nozzle arrangement configured to:
receive steam from a steam source through a steam entry aperture; and
be selectively movable into one of: a first switching position, a second switching position and a third switching position;
wherein the steam delivery nozzle arrangement comprises:
a single steam delivery nozzle selectively movable by the displaceable switching member into one of:
the first switching position, wherein the steam delivery nozzle is in communication with the first steam inlet duct, for producing a frothed beverage;
the second switching position, wherein the steam delivery nozzle is in communication with the second steam inlet duct for producing a hot, unfrothed beverage;
and the third switching position, wherein the steam delivery nozzle is in communication with both the first steam inlet duct and the second steam inlet duct wherein one of: hot water and steam is delivered through both the first beverage passageway and the second beverage passageway.

2. The beverage frothing device of claim 1, wherein the second beverage passageway comprises:
a second beverage dispensing spout, wherefrom the unfrothed beverage is dispensed.

3. The beverage frothing device of claim 1, wherein the displaceable switching member is displaceable by rotation about a rotation axis (A-A) to selectively move the steam delivery nozzle in one of: the first switching position, the second switching position and the third switching position.

4. The beverage frothing device of claim 1, wherein the displaceable switching member further comprises:
a beverage feeding duct, which can be brought in communication with one of: the first beverage suction duct, when the steam delivery nozzle is in the first position and the second beverage suction duct, when the steam delivery nozzle is in the second position.

5. The beverage frothing device of claim 1, wherein the steam delivery nozzle comprises:
a first end opening; and
a second end opening the first end opening in communication with a steam distribution chamber, which has a dimension in the direction of displacement of the displaceable switching member, such that in both the first switching position and the second switching position the steam distribution chamber is in communication with the steam entry aperture, to establish a flow connection between the steam entry aperture and one of: the first steam inlet duct and the second steam inlet duct, and the second end opening of the steam delivery nozzle has a cross section that is sufficiently small for establishing a flow connection with one of the first steam inlet duct and the second steam inlet duct, depending upon the position of the displaceable switching member.

6. The beverage frothing device of claim 5, wherein in the third switching position of the displaceable switching member, the second end opening of the steam delivery nozzle is facing the steam entry aperture and the steam distribution chamber establishes a communication between the steam delivery nozzle and both the first steam inlet duct and the second steam inlet duct.

7. The beverage frothing device of claim 6, wherein in the third switching position the first beverage suction duct and the second beverage suction duct are closed by a shutter integrally movable with the switching member.

8. A beverage jug comprising a beverage frothing device according to claim 1.

9. The beverage jug of claim 8, comprising:
a jug body; and
a jug cover, wherein the jug cover supports the beverage frothing device.

10. A beverage-producing machine comprising a steam delivery line and a beverage frothing device according to claim 1, connectable to the steam delivery line, to establish a communication between the steam delivery line and the steam feeding arrangement of the beverage frothing device.

11. The beverage-producing machine of claim 10, wherein the beverage frothing device is supported by a beverage jug.

* * * * *